United States Patent
King

(10) Patent No.: US 12,315,248 B2
(45) Date of Patent: May 27, 2025

(54) SYSTEM AND METHOD FOR PERFORMING MACHINE VISION RECOGNITION OF DYNAMIC OBJECTS

(71) Applicant: Automated Fruit Scouting Inc., Spanaway, WA (US)

(72) Inventor: Matthew Charles King, Spanaway, WA (US)

(73) Assignee: Automated Fruit Scouting Inc., Spanaway, WA (US)

( * ) Notice: Subject to any disclaimer, the term of this patent is extended or adjusted under 35 U.S.C. 154(b) by 288 days.

(21) Appl. No.: 17/794,550

(22) PCT Filed: Jan. 25, 2021

(86) PCT No.: PCT/US2021/014839
§ 371 (c)(1),
(2) Date: Jul. 21, 2022

(87) PCT Pub. No.: WO2021/154624
PCT Pub. Date: Aug. 5, 2021

(65) Prior Publication Data
US 2023/0073541 A1    Mar. 9, 2023

Related U.S. Application Data

(60) Provisional application No. 62/966,087, filed on Jan. 27, 2020.

(51) Int. Cl.
*G06V 20/10* (2022.01)
*G06T 7/136* (2017.01)
*G06V 10/82* (2022.01)

(52) U.S. Cl.
CPC ............ *G06V 20/188* (2022.01); *G06T 7/136* (2017.01); *G06V 10/82* (2022.01); *G06T 2207/30188* (2013.01); *G06V 2201/07* (2022.01)

(58) Field of Classification Search
CPC .. G06V 20/188; G06V 10/82; G06V 2201/07; G06T 7/136; G06T 2207/30188; G06N 3/045; G06N 3/08; G06N 5/04; G06N 99/00; A01G 7/00
See application file for complete search history.

(56) References Cited

U.S. PATENT DOCUMENTS

| | | |
|---|---|---|
| 2016/0148104 A1 | 5/2016 | Itzhaky et al. |
| 2016/0223506 A1 | 8/2016 | Shriver et al. |
| 2019/0065901 A1* | 2/2019 | Amato .............. G06F 18/24133 |
| 2019/0103095 A1 | 4/2019 | Singaraju et al. |
| 2019/0104722 A1 | 4/2019 | Slaughter et al. |
| 2019/0220967 A1* | 7/2019 | Bhatt .................... G06T 7/0002 |
| 2019/0259108 A1* | 8/2019 | Bongartz ............... A01G 31/02 |
| 2019/0392211 A1 | 12/2019 | Hartman et al. |
| 2020/0344965 A1* | 11/2020 | Song ...................... H05B 47/16 |

FOREIGN PATENT DOCUMENTS

| | | | |
|---|---|---|---|
| CN | 104751199 A | * | 7/2015 |
| CN | 108647652 A | * | 10/2018 |
| CN | 109523509 A | * | 3/2019 |
| CN | 110196053 A | * | 9/2019 |

OTHER PUBLICATIONS

International Search Report and Written Opinion, mailed Apr. 1, 2021, for International 1 Patent Application No. PCT/US2021/014839. (8 pages).

* cited by examiner

*Primary Examiner* — Samir A Ahmed
(74) *Attorney, Agent, or Firm* — Seed Intellectual Property Law Group LLP

(57) ABSTRACT

A method for performing machine vision recognition activities for a dynamic object is disclosed, which includes the steps of (i) creating a digital image series that includes a seed digital image set including digital images and at least one subsequent digital image set including digital images; (ii) creating an object detector series, said creating step (ii) comprising a) creating a seed object detector from the seed digital image set, the seed object detector comprising an architecture and a set of weights directed to recognition of target objects; and b) creating at least one deep learning object detector from the at least one subsequent digital image set and derived from said seed object detector, the deep learning object detector including a deep learning architecture and a set of weights trained for recognition of the evolution of the target objects over time.

20 Claims, No Drawings

SYSTEM AND METHOD FOR PERFORMING MACHINE VISION RECOGNITION OF DYNAMIC OBJECTS

PRIORITY APPLICATION INFORMATION

The present application claims priority to U.S. Provisional Application Ser. No. 62/966,087 filed Jan. 27, 2020 and entitled "SYSTEM AND METHOD FOR PERFORMING MACHINE VISION RECOGNITION OF DYNAMIC OBJECTS", the entire contents and description of which is incorporated herein by reference.

FIELD OF THE INVENTION

The present invention broadly relates to the field of digital image, computer-based recognition activities (such as for example counting) in systems and environments that generally involve growth, change and development of dynamic objects such as living organisms, stars, crystals and the like. More particularly, the present invention relates to the fields of farming, crops and crop growth management and specifically systems and methods for performing orchard scouting activities.

BACKGROUND OF THE INVENTION

The ability to classify, locate and count growing items such as vegetables, fruits, nuts and the like during the growing season is highly desirable. A farmer who can reliably and accurately scout crop development in real time over the course of a growing season can efficiently choose and cost-effectively and timely implement agricultural steps such as fertilization, pesticide application, thinning and other measures to optimize orchard performance. Accurate and continuously updated crop development information also facilitates efficient and cost-effective implementation of logistical items related to orchard management, such as for example harvest manpower resourcing and equipment purchasing, packing and shipping requirements and the like. By way of example, it is estimated by some apple growers that a variation in crop count of as little as 1% drives millions of U.S. dollars in costs related to implementation of orchard management steps.

In many farming applications, efforts to monitor the crop growth process and count crops at their various stages of development have been limited to human inspection and tabulation. This approach has been historically associated with high labor costs, inaccurate counts and inconsistent and non-uniform counting procedures. Further, accurate human count methods are hampered by the fact that human eye detection of fruits, flowers and the like may be physically blocked by neighboring fruits, branches, leaves and other components of the plant. Human counts are also simply not verifiable. These disadvantages are often compounded when results from analyzing select portions of the crop-growing area are aggregated or extrapolated to the entirety of the crop-growing area.

In the interest of attempting to resolve some of these drawbacks, some prior art has looked to automated imaging and image analysis. For example, U.S. Pat. No. 9,228,990 describes a system for predicting production of a fruit tree, including a plant image obtaining unit collecting images of a fruit tree and confirming identification information about the fruit tree from the collected images, a branch pattern recognizing unit and a fruit tree bud recognizing unit. This system collects information at a single point in time, is focused on predicting end-of harvest fruit tree production and provides none of the critical information regarding fruit load or other variables that drive grower's operational decision-making (and therefore spending) during the growing season. Further, predictions based solely on buds rely on data generated very early in the growing process and can prove inaccurate. In another example, U.S. Published Patent Application No. 2018/0025480 describes a vehicle—mounted apparatus for analysis of growing items having a camera configured to capture multiple sequential images of growing items, a memory comprising an image buffer for storing the images, a processor, software, which when executed on the processor is configured to repeatedly call an image from the image buffer, process the image to identify individual growing items to create item data relating to individual growing items, and update a growing item database by adding the item data wherein the software is configured to run whilst the camera captures further images, and the images are discarded once processed. In addition to the continuous requirement to delete data and discard images, this device depends on a decades-old discrete segmentation approach that detects a single variable (color) using human interaction to continuously select targets and calibrate results, likely resulting in significant errors and inconsistencies. In yet another example, U.S. Pat. No. 10,139,279 describes a system for biosensing a predefined state of crops that employs an unmanned aerial vehicle such as a drone for collecting hyperspectral data. Such aerial systems may be materially less effective in counting and detecting applications where fruit such as apples is grown on trees which generate a canopy of dense leaves to protect the underlying fruit from overexposure to the sun.

Despite the above innovations, an unmet need remains for a low-cost and effective method and system for performing orchard scouting activities during a growing season that generates reliable models for activities such as fruit counts and disease counts and densities during a growing season while also creating models useful for orchard management in subsequent growing seasons. No method or system known to the present Applicant addresses the complexities created by the fact that dynamic objects such as living, growing organisms and crops such as fruits in particular, change over time. A solution is therefore needed that recognizes such dynamic target objects and their evolution.

SUMMARY OF THE INVENTION

In a first aspect, the present invention is a method for performing machine vision scouting activities for an orchard during a growing season. The method of the present invention includes the steps of (i) creating a digital image series that includes a seed digital image set including digital images and at least one subsequent digital image set including digital images, wherein the at least one subsequent digital image set is generated subsequent in time to the seed digital image set; (ii) creating an object detector series, the object detector series in aggregate also being referred to herein as an "integral object detector", said creating step (ii) comprising a) creating a seed object detector from the seed digital image set, the seed object detector comprising an architecture and a set of weights directed to recognition of target objects; and b) creating at least one deep learning object detector from the at least one subsequent digital image set and derived from said seed object detector, the deep learning object detector including an architecture and a set of weights trained for recognition of the evolution of the target objects over time during said growing season; and optionally (iii) creating a report from the at least one deep learning object detector.

In another aspect, the present invention is directed to a system for performing machine vision scouting activities for an orchard during a growing season. The system of the present invention includes (i) a digital image series that includes a seed digital image set comprising digital images and at least one subsequent digital image set comprising digital images, wherein said at least one subsequent digital image set is generated subsequent in time to said seed digital image set; and (ii) an object detector series that includes a) a seed object detector created from the seed digital image set, the seed object detector including an architecture and a set of weights directed to recognition of target objects; and b) at least one deep learning object detector created from said at least one subsequent digital image set and trained from said seed object detector, the deep learning object detector including a deep learning architecture and a set of weights trained for recognition of the evolution of said target objects over time during said growing season.

In another aspect, the present invention is directed to a method for performing machine vision scouting activities for an orchard. In this aspect, the method the present invention includes the steps of creating an integral object detector during a first growing season and utilizing the integral object detector to perform machine vision scouting activities in at least one second growing season that is subsequent in time to said first growing season.

In still another aspect, the present invention is directed to a method for performing machine vision recognition activities for dynamic objects. In this aspect, the method of the present invention includes the steps of (i) creating a digital image series that includes a seed digital image set including digital images and at least one subsequent digital image set including digital images, wherein the at least one subsequent digital image set is generated subsequent in time to the seed digital image set; (ii) creating an object detector series, said creating step (ii) comprising a) creating a seed object detector from the seed digital image set, the seed object detector comprising an architecture and a set of weights directed to recognition of target objects; and b) creating at least one deep learning object detector from the at least one subsequent digital image set and derived from said seed object detector, the deep learning object detector including an architecture and a set of weights trained for recognition of the evolution of the target objects over time during said growing season; and optionally (iii) creating a report from the at least one deep learning object detector.

In yet another aspect, the present invention is directed to a system for performing recognition activities for living organisms. In this aspect, the system of the present invention includes i) a digital image series that includes a seed digital image set comprising digital images and at least one subsequent digital image set comprising digital images, wherein said at least one subsequent digital image set is generated subsequent in time to said seed digital image set; and (ii) an object detector series that includes a) a seed object detector created from the seed digital image set, the seed object detector including an architecture and a set of weights directed to recognition of target objects; and b) at least one deep learning object detector created from said at least one subsequent digital image set and trained from said seed object detector, the deep learning object detector including a deep learning architecture and a set of weights trained for recognition of the evolution of said target objects over time.

Further aspects of the invention are as disclosed and claimed herein.

DETAILED DESCRIPTION

Certain terms and phrases utilized in the description of the present invention set forth herein are defined as indicated below and elsewhere set forth.

The term "orchard" means a space that includes a collection or group that includes living agricultural plants. Non-limiting examples of agricultural plants include fruit-bearing, vegetable-bearing, nut-bearing and berry-bearing, flowering and medicinal-bearing plants including trees, bushes, vines and the like as well as growing decorative or landscaping trees, plants and bushes. Orchards may be exemplified by collections or groups of trees or plants, growing for example in containers or in the ground, useful in landscaping or decoration or for growing fruits such as apples or vegetables; vineyards for growing grapes and groves for growing nuts. The term orchard is also intended to include smaller divisions, portions or components of an orchard that are sometimes referred to in the art as "blocks". Orchards, as well as blocks, may include a collection or group of the same plant type or a mix of one or more plant types.

The phrase "deep learning" is one type of a broader family of machine learning methods that is based on artificial neural networks. Deep learning can be for example supervised, semi-supervised, unsupervised, reinforced and combinations thereof. Deep learning architectures are differentiated from other types of machine learning by the type of artificial neural network or architecture employed.

The phrase "artificial neural network", also sometimes referred to herein as "architecture", means a computing system, loosely inspired by the biological neural networks that constitute animal brains, which performs tasks by considering examples, generally without being programmed with task-specific rules. For example, in image recognition, artificial neural networks might identify images that contain cats by analyzing example images that have been manually labeled as "cat" or "no cat" and using the results to identify cats in other images by generating identifying characteristics from the examples that they process. Architectures or artificial neural networks generally include a collection of connected units or nodes called artificial neurons, which loosely model the neurons in a biological brain, with each neuron capable of receiving a signal, processing it and as appropriate signaling neurons connected to it. Artificial neural networks are known in the art, and way of non-limiting example include Feedforward Neural Networks, Radial Basis Function Neural Networks, Kohonen Self Organizing Neural Networks, Convolutional Neural Networks, Recurrent Neural Networks, Long Short Term Memory Neural Networks and Modular Neural Networks, each of which may be utilized alone combined together in whole or in part for a given purpose.

The phrase "image classifier" means an artificial neural network of a form that accepts as an input a digital image and infers one or more labels for each class it has been trained to recognize. The output may also include a confidence level for that label. An image classifier typically includes an architecture and a set of trainable "weights", defined below, that are specific for a class or classes of target objects wherein the architecture is different from the architecture for the object detector defined below. By way of example, an image classifier may receive as input a digital image containing a cat and outputs the label of "cat".

A "deep learning object detector" is a specific type of image classifier of a form that accepts as an input a digital image and outputs a detection that includes one or more labels for each class it has been trained to recognize one and one or more pairs of localization parameters, typically but not exclusively in the form of a bounding box describing the rectangular (or cubic in 3D implementations) extents of the detection. A deep learning object detector may be of the sub-type 'segmenter', and output localization on a per pixel basis. Deep learning object detectors may have one or more, or two or more, or at least sixteen layers. The output may include a confidence level for each detection. By way of example, a deep learning object detector may receive as input a digital image containing a cat and output the label of "cat" with a defined localization contained within a defined boundary box within the image. A deep learning object detector typically includes an architecture and a set of trainable "weights", defined below, that are specific for a class or classes of target objects. Weights may be applied to the neurons of the network and their connections to adjust signal transfer and strength and typically change or adjust as deep learning proceeds.

A "weight" is the relative importance assigned to each connection between one neuron and another neuron with each connection providing the output of one neuron as an input to another neuron and a given neuron having multiple input and output connections. "Training" is the process of changing the weights to achieve a desired or preferred or optimal output, during which process the weights "learn".

The phrase "object detector series", sometimes referred to herein as an "integral object detector", means a set of deep learning object detectors for analysis or recognition (e.g., target object count, disease detection or the like) of a specific target object or target class sequenced over a time period over which the target object may evolve, grow or change. The series may include the first detector in the series, referred to herein as a "seed object detector", which is created from a seed digital image set and then trained by deep learning methods to create at least one, or a sequence of, deep learning object detectors generated for example weekly over for example the growing season of a crop.

The term "segmentation" generally means defining space or area, typically at a per pixel level. By way of example, the present invention may employ segmentation to define and exclude negative space or area at a per pixel level that is inapplicable to or not part of a target class in a digital image. Segmentation is performed by a "segmenter", which is an artificial neural network or architecture of a form that accepts as an input a digital image and outputs one or more masks and a label therefore and creates a "segmentation mask". The output may include a confidence level for each detection. By way of non-limiting example, portions of a digital image capturing non-target plants, the ground, target objects actually on the ground or images reflected from the ground such as by light-reflecting, ground-covering polymeric sheet such as Mylar™ sheets may be masked via segmentation performed by a segmenter. Some segmenters can be "trained" and therefore "learn" and are referred to as deep learning segmenters, while discreet segmenters are not capable of learning.

"Training" is the supplying of sample observations, also called an annotation set, for the purpose of adapting a classifier to better handle a task. More specifically, training is the process of changing weights to achieve a desired or preferred or optimal output, during which process the weights "learn". When describing an object detector, "trained from" means that the detector is provided with an annotation set which, in the case of the seed object detector, may be sourced from a human while in the case of a deep learning object detector in a sequence, may be sourced from a preceding detector in the sequence. "Learning" is an object detector's weight adjustments to improve the detector's ability to handle a task, for example by improving accuracy of results by identification of a preferred or optimal set of weights.

In a first aspect, the present invention is directed to a method for performing machine vision scouting activities for an orchard during a growing season. Scouting activities is a phrase generally intended to encompass any and all activities undertaken by a grower, orchard owner or related party to ascertain orchard variables and their evolution during the course of a growing season in order to make operational decisions related thereto, in particular during that growing season. Scouting activities may include fruit count and sizing (wherein fruit includes flowers that evolve into fruits), disease count and density, irrigation function inspection and the like. "Machine vision" is intended to include all activities which involve the creation of a digital image and computer analysis of that image. The method of the present invention includes the steps of (i) creating a digital image series that includes a seed digital image set including digital images and at least one subsequent digital image set including digital images, wherein the at least one subsequent digital image set is generated subsequent in time to the seed digital image set; and (ii) creating an object detector series, said creating step (ii) comprising a) creating a seed object detector from the seed digital image set, the seed object detector comprising an architecture and a set of weights trainable for recognition of target objects; and b) creating at least one deep learning object detector from the at least one subsequent digital image set and trained from said seed object detector, the deep learning object detector including an architecture and a set of weights trainable for recognition of the evolution of the target objects over time during said growing season. The method of the present invention may also include a step (iii) of creating a report from said at least one deep learning object detector.

Step (i) of the method of the present invention includes creating a digital image series. The digital image series includes a seed digital image set and at least one subsequent digital image set, each comprising a plurality of digital images. At least some of the digital images in each digital image set contain target object or dynamic object digital images. Non-limiting examples of digital images include two-dimensional (2D) images and three-dimensional (3D) data such as 3D images, depending on the type of image generator employed. The term "subsequent" is used to indicate that the at least one subsequent digital image set is generated subsequent in time to the seed digital image set. Digital images may be created by digital image generators known in the art, for example digital microscopes and telescopes, digital 2D and 3D video recorders, digital 2D and 3D still-image digital cameras and like. Digital image generators may be mounted for example on or in buildings or greenhouses; aerial vehicles, and on land-traversing vehicles particularly on-board human-driven vehicles such as tractors, 4×4s, golf carts and the like.

In one or more embodiments, the at least one subsequent digital image set includes a plurality of subsequent digital image sets sequenced periodically over the course of a select time period such as a growing season. By way of non-limiting example, a digital image series for the growing season of a Pink Lady apple varietal may include a seed digital image set and from 12 to 20 subsequent digital image sets generated on a weekly basis during the growing season, though the frequency of the digital image sampling may be adjusted to reflect the rate of change in the target object.

Step (ii) of the method of the present invention includes creating an object detector series. The creating step (ii) includes (a) creating a seed object detector from the seed digital image set, with the seed object detector including an architecture and a set of weights directed to the recognition of target objects; and (b) creating at least one deep learning object detector from the at least one subsequent digital image set and trained from said seed object detector, said deep learning object detector including said target objects during the growing season. Target objects may include without limitation dynamic objects, particularly dynamic objects useful in orchard observation and management decision-making, that can change (including for example change in shape, form, color, condition or size) over time. Non-limiting examples of target objects may include dynamic objects, cells and cellular organisms at a microscopic scale and, at a macroscopic scale applicable to orchards, fruit flowers, immature fruits, overlapping or bunched fruits, leaves, spots or areas of disease and the like. "Recognition" of target objects may include for example one or more of location, classification, identification and summation or counting or tallying of target objects.

Architectures for creating the object detectors described herein (seed and deep learning) are known in the art and commercially available. Typically, object detection architecture has a backbone that is an image classification architecture, combined with another network architecture that performs a localization function. Typically, the resulting object detection architecture is just called by the name of the object detection component. Non-limiting examples of object detection architecture include Single Shot Detector (SSD); SSD with MobilNets (an object classification backbone); You Only Look Once (YOLO); Region-Based Convolutional Neural Network (RCNN); Region-Based Fully Convolutional Network (R-FCN); Fast Region Based Convolutional Neural Network (Fast R-CNN); Faster Region Based Convolutional Neural Network (Faster R-CNN); Objects as Points; RetinaNet; SNIPER; CornerNet and CenterNet.

The seed object detector is the first (in sequence) object detector in the object detector series. The seed object detector is created from the seed digital image set and then annotated by training methods that may be supervised or semi-supervised in nature. The seed object detector includes an architecture and a set of weights directed to the recognition of target objects.

The at least one deep learning object detector is created from the at least one subsequent digital image set and is trained from the seed object detector in the sense that deep learning methods are applied to annotate the at least one deep learning object detector from the seed object detector. The deep learning object detector may include an architecture and a set of weights trained for recognition of the change or evolution of the target objects over time such as during said growing season. Stated another way, the weights may be trained for location, classification, identification and summation or counting or tallying of target objects as well as for changes in form, size, color or condition of the target objects over time. The at least one deep learning object detector may be a single class detector, meaning that it is trained to a singular target object class or it may be a multiclass detector, meaning that it is trained to two or more target object classes. In one or more embodiments, the at least one deep learning object detector includes an architecture and a set of trainable weights specific to the target objects. In some embodiments, at least one deep learning object detector may be a multi-class object detector. For example, an object detector for counting PinkLady apples (a single class detector) might be combined with a detector for Leaf Rot disease (a separate single-class detector) to form a multi-class detector in order to process digital images for those classes serially instead of in parallel.

In one or more embodiments, the at least one deep learning object detector is a deep learning object detector sequence. The deep learning object detector sequence is a plurality of deep learning object detectors, with the first deep learning objector detector in the sequence trained from or annotated by the seed object detector and the remaining deep learning object detectors in the sequence each trained from or annotated by a preceding deep learning object detector in the sequence. The deep learning object detector sequence may include a plurality of deep learning object detectors created periodically over the course of a defined time period such as a growing season. The actual number of deep learning object detectors in the sequence may vary widely depending on a number of factors such as for example type of target object, time length of a growing season, target object life span and growth rate and more generally rate of change for living organisms, plants and target objects, the type of agricultural product, the time length between creating digital image sets in the digital image series, and the like. By way of non-limiting example, the number of deep learning object detectors in a deep learning object detector sequence might range from 12 to 20 in a method for performing machine vision scouting activities for a Pink Lady apple orchard in a method wherein 12 to 20 digital image sets are generated on a weekly basis (though the frequency of the digital image sampling may be adjusted to reflect the rate of change in the target object during a growing season). Similarly, an object detector series for performing machine vision scouting activities for a Pink Lady apple orchard may include a seed object detector and a deep learning object detector sequence that includes from 12 to 20 deep learning object detectors.

Though the term "sequence" has been used in the context of describing a plurality of deep learning object detectors, it is to be understood that the deep learning object detectors may be arranged in parallel or in series, depending in part on their form as single-class or multi-class object detectors. Further, the term "sequence" is meant to expressly include a plurality of deep learning detectors that include as part of a sequence one or more object detector annotated at least in part by human interaction. Such object detectors, termed herein "reset" object detectors, may be inserted in the sequence to reset or re-engage the sequence, for example when inadvertent delays (such as for example weather delays) occur in creating digital image sets for the digital image series or when the target object undergoes a discontinuous change, as a non-limiting example; from flower into fruit.

As the creation of a given deep learning object detector in a deep learning object detector sequence requires the existence of a corresponding subsequent digital image set, the creation of the subsequent digital image set must necessarily occur prior to the creation of a corresponding deep learning object detector. In many typical embodiments of the method of the present invention, then, each deep learning object detector in a sequence will be created soon in time after the corresponding subsequent digital image set is created such that the general timing for creating each deep learning object detector in a sequence will generally follow the timing for creating each subsequent digital image set. Accordingly, and as described above, a deep learning object detector sequence may include a plurality of deep learning object detectors created periodically over the course of a defined period such as a growing season, preferably in order that follows the creation of the digital image sets in the series. In one or more embodiments, the first deep learning object detector in the deep learning object detector sequence corresponds to the first (in time) digital image set in the series. It will be appreciated by a person of ordinary skill in the art, however, that such timing limitations or restrictions are not absolutely required to practice the method of the present invention. By way of non-limiting example, the method of the present invention may include (i) creating a plurality of subsequent digital image sets over the course of a growing season and then (ii) creating a deep learning object detector sequence after completion of creating step (i).

Further, it can be appreciated that the first deep learning object detector in the deep learning object detector sequence could correspond to the last (in time) digital image set in the series. As a non-limiting example, the digital object detector sequence could begin with a digital object detector corresponding to a digital image set capturing a mature target object such as a ripe apple and progress through digital image sets capturing earlier (in time) target objects such as younger, smaller apples.

Step (iii) in the method of the present invention, optional in one or more embodiments, includes creating a report from at least one deep learning object detector. Creating step (iii) is intended to broadly include any processing, organizing, combining, formatting or other manipulation of deep learning object detector information to facilitate a user's use of the information in operational decision-making. Non-limiting examples of creating step (iii) may include creating a spreadsheet of the counts, arranged by row number and tree (column) number, where the count is a hyperlink to an image of the tree with boxes drawn around each detected apple. Software to perform the creating step (iii) is well known in the art and exemplified by Google Sheets® available from Google Inc.

In one or more embodiments, the method of present invention may further include the step of managing an orchard based on information contained in the report created in creating step (iii). Managing the orchard is intended to include any decision-making, evaluation, implementation, execution or omission of active or passive steps related to the orchard, including for example (i) agricultural decisions such as fertilizer application, pesticide application, irrigation, thinning and the like and (ii) logistical decisions such as harvest resourcing, equipment needs, packaging purchases, shipping arrangements and the like.

In one or more embodiments, the method of the present invention may include the step of segmentation to form a segmentation mask for masking inapplicable portions of the digital images of the digital image series. The phrase "inapplicable" portions as used herein is intended to encompass digital image portions, defined at a per pixel level, that are not relevant with respect to target objects. By way of non-limiting example, inapplicable portions may include portions of digital images which capture the ground or ground-covering polymeric sheet. Preferably, the segmentation step is performed between the creating step (i) and the creating step (ii). Segmentation or forming a segmentation mask may be performed by a segmenter with segmentation architecture known in the art and commercially available and exemplified by Mask Region Based Convolutional Neural Network (Mask R-CNN); Tiramisu; Gated Shape Convolutional Neural Network (Gated-SCNN); and Deep-Lab. Segmentation may be performed at a 2D and/or 3D level based on the form of the digital images and digital image sets as 2D and/or 3D. In one or more embodiments, the segmenter includes a deep learning segmenter or a non-learning segmenter algorithm. In one or more embodiments, the segmenter includes a 2D segmenter. In one or more embodiments, the segmenter includes a 3D segmenter.

An important feature of the method of the present invention is that it may include as discrete target objects the various evolutionary stages of those target objects over a growing season as well as for the entirety of the life cycle of target object, for example from fruit flower to mature fruit. In one or embodiments, the method of the present invention creates over a given growing season an "integral object detector" that recognizes the evolution of target objects over time and that is useful in performing machine vision scouting in subsequent growing seasons. An "integral object detector" is intended to mean the object detector series created as part of the method of the present invention. "Integrating" is intended to mean the process of connecting each of the object detectors in the objector detector series as part of the method of the present invention. In one or more embodiments, then, the present invention is a method for performing machine vision scouting activities for an orchard that includes the steps of creating an integral object detector during a first growing season and utilizing the integral object detector to perform machine vision scouting activities in at least one second growing season that is subsequent in time to said first growing season.

A related important feature of the method of the present invention is that it creates during a growing season an object detector series, more particularly a deep learning object detector and even more particularly a deep learning object detector sequence that may be useful to a user in subsequent growing seasons. Accordingly, in one or more embodiments, the method of the present invention may include the further step of performing scouting activities for an orchard during a subsequent growing season that is subsequent to the growing season using the at least one deep learning object detector, preferably the deep learning object detector sequence, and more preferably the object detector series or the integral object detector from the growing season.

Another important feature of the method of the present invention is that it can cost-effectively provide for useful and accurate scouting for an orchard without undue extrapolation or aggregation from small sample sizes that may be wrought with human error. Accordingly, in one or more embodiments, the creating step (i) includes creating digital images of from 0.1% to 100% or from more than 5% or from more than 10% or from more than 15% of the total number of plants of an orchard.

Another important feature of the present invention is that it can provide highly accurate, reliable and verifiable target object recognition that is markedly improved over the prior art. Such accuracy, reliability and verifiability can be quantitatively demonstrated by one or more calculations, which calculations are typically used during the training process to programatically select the best performing set of weights. Accordingly, in one or more embodiments, the present invention may achieve an F1 of 0.75 or higher or 0.80 or higher or 0.85 or higher or 0.90 or higher or 0.95 or higher, wherein F1 is calculated as:

$F1=2*(precision*recall)/(precision+recall)$ wherein:

$precision=(true\ positives)/(true\ positives+false\ positives)$, recall=(true positives)/(true positives+false negatives), and:
true positives are detections that match a ground truth,
false positives are detections that do not match a ground truth,
false negatives are a lack of a detection to match a ground truth,
and ground truths are the set of detections defined as the reference against which results are measured.

In one or more embodiments, the present invention may achieve an moLRP, also known as oLRP, or LRP, of 0.20 or lower or 0.15 or lower or 0.10 or lower or 0.05 or lower. Localization Recall Precision (LRP) is an objection detection error measurement metric known in the art and is described in more detail for example in Oksuz et al, *Localization Recall Precision (LRP): A New Performance Metric for Object Detection* published as part of the 2018 European Conference on Computer Vision (ECCV) conference (see http://openaccess.thecvf.com/content_ECCV_2018/papers/Kemal_Oksuz_Localization_Recall_Precision_ECCV_2018_paper.pdf). moLRP is calculated as indicated below with X is the set of ground truth bounding boxes
Y is the set of detected bounding boxes
s is the confidence score
$Y_s$ is the set of detections above confidence s
IoU is the area of overlap divided by the area of union
τ is the IoU threshold
$N_{TP}$ is the number of true positives
$N_{FP}$ is the number of false positives
$N_{FN}$ is the number of false negatives $$Z=N_{TP}+N_{FP}+N_{FN}$$

$$\omega_{IoU}=(N_{TP})/(1-\tau)$$

$$\omega_{FP}=|Y_s|$$

$$\omega_{FN}=|X|$$

The LRP error can be calculated as:

$$LRP(X, Y_s) := \frac{1}{N_{TP} + N_{FP} + N_{PN}} \left( \sum_{i=1}^{N_{TP}} \frac{1 - IoU(x_i, y_{x_i})}{1 - \tau} + N_{FP} + N_{FN} \right)$$

The $LRP_{IoU}$ measure of bounding box tightness can be calculated as:

$$LRP_{IoU}(X, Y_s) := \frac{1}{N_{TP}} \sum_{i=1}^{N_{TP}} (1 - IoU(x_i, y_{x_i})),$$

Which implies that the average IoU of a valid detection is:

$$1-LRP_{IoU}(X,Y_s).$$

Further, the optimal achievable minimum LRP error at a given IoU threshold for a given detector can be defined as:

$$oLRP\tau:=\min LRP(X,Y_s)$$

And finally, the Mean Optimal LRP (moLRP) for a given class c is defined as:

$$moLRP := \frac{1}{|C|} \sum_{c \in C} oLRP_c.$$

In one or more embodiments, the present invention may achieve a mean Average Precision (mAP) of 0.75 or higher or 0.80 or higher or 0.85 or higher or 0.90 or higher or 0.95 or higher wherein mAP is calculated by the method below:

Step(i)—For the entire dataset, sort all of the detections with the same class with respect to their confidence scores.

Step(ii)—For each detection, label it as a True Positive, False Positive or False Negatives based on its Intersection over Union (IoU) related to the selected IoU threshold (typically 0.5). Note that in this step, a ground truth may only be matched with one detection, which is the detection with the highest confidence from the list in Step(i).

Step(iii)—Iterate through the sorted detection list from Step(i), and plot the Recall-Precision curve, where:

precision=(true positives)/(true positives+false positives), recall=(true positives)/(true positives+false negatives)

Step(iv)—To smooth the Recall-Precision curve, point interpolate to the highest precision possible at the positive side of the recall point, generating the interpolated Recall-Precision curve.

Step(v)—Use one of three methods to compute the Average Precision (AP) per class from the interpolated Recall-Precision curve.

Method 1—Find the area under the curve. This method is known in the art and used by ImageNet Object Detection Challenge. Calculating the area under a curve is a mathematical operation known in the art and first described by Newton et al. in *Philosophiae Naturalis Principia Mathematica*, published by the Edmund Halley of the Royal Society in April 1686.

Method 2—Divide the recall domain into evenly spaced slices (typically 11) and average the precision values at these recall values. This method is known in the art and used in Pascal VOC competitions and is described for example in further detail in the Development Kit published for the competitions at: http://host.robots.ox.ac.uk/pascal/VOC/voc2012/VOCdevkit_18-May-2011.tar.

Method 3—An extension of Method 2, using 101 recall slices, and computing AP for 10 different True Positive validation thresholds (typically a series ranging from 0.5 up to 0.95, in 0.05 increments) in terms of IoU in order to implicitly include localization error. This method is known in the art and used in Microsoft COCO competitions and is described for example in more detail in Detection Evaluation Metrics for the competition published at http://cocodataset.org/#detection-eval.

Step(vi)—Compute the Mean Average Precision(mAP) as the average AP over all classes.

In another aspect, the present invention is directed to a system for performing machine vision scouting activities for an orchard during a growing season. The system of the present invention includes (i) a digital image series that includes a seed digital image set comprising digital images and at least one subsequent digital image set comprising digital images, wherein the at least one subsequent digital image set is generated subsequent in time to said seed digital image set; and (ii) an object detector series that includes a) a seed object detector created from said seed digital image set and including an architecture and a set of weights directed to recognition of target objects; and b) at least one deep learning object detector created from the at least one subsequent digital image set and trained from said seed object detector, the deep learning object detector comprising a deep learning architecture and a set of weights trained for recognition of the evolution of said target objects over time during said growing season.

In a preferred embodiment, the at least one deep learning object detector includes a deep learning object detector sequence. The deep learning object detector sequence includes a plurality of deep learning object detectors, each trained from a preceding deep learning object detector in said sequence.

In one or more embodiments, the system of the present invention includes a digital image generator. The digital image generator may be used to generate the digital images that are included in the digital image series. Non-limiting examples of digital image generators include one or more still-image cameras, video cameras and 3D sensors (including 3D cameras). Depending on the specific environment in which an embodiment of the system is employed, digital image generators may be mounted for example, on or in greenhouses and buildings or the like; on motorized, land-traversing vehicles or aerial vehicles. In one or more embodiments, the digital image generator may be two still-image digital cameras or a plurality of still-image digital cameras. In one or more embodiments, the digital image generator may be mounted on a motorized land-traversing personal vehicle, more particularly an on-board-human-driven vehicle such as a tractor, golf cart, 4×4 or other similar vehicle typically used for performing manual-based agricultural tasks on farms, orchards and the like. In one or more embodiments, the digital image generator may be mounted on a motorized land-traversing personal vehicle, more particularly an autonomous vehicle such as a tractor, golf cart, 4×4 or other similar vehicle typically used for performing manual-based agricultural tasks on farms, orchards and the like or autonomous aerial vehicles such as autonomous drones.

In one or more embodiments, the system of the present invention further includes a reporting system. The reporting system may be used to create a report, typically containing information, from the at least one deep learning object detector. The term "reporting system" is intended to include without limitation any software, system, computer program or the like capable of processing, organizing, formatting or manipulation of deep learning object detector information to facilitate a user's use of the information in operational decision-making. A non-limiting example of a reporting system is Google Sheets available from Google Inc.

In one or more embodiments, the system of the present invention further includes a segmenter. The segmenter may be used to form a segmentation mask, which may be 2D or 3D in form, masking inapplicable portions of said digital images. The segmenter includes segmentation methods as exemplified by the architectures listed elsewhere herein. In one or more embodiments, the segmenter may be a deep learning segmenter, or a discreet non-learning segmenter algorithm, and may be a 2D segmenter or a 3D segmenter.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

More particularly, while the present invention is described with respect to machine vision scouting activities for an orchard, embodiments more broadly directed to machine vision object recognition activities (expressly including without limitation counting, location, classification, identification, changes in condition, status, size and the like) in other systems and environments are contemplated. In one non-limiting example, the method and system of the present invention may be utilized in performing machine vision object recognition activities for plants in containers, such as in greenhouse applications wherein for example a containered plant inventory changes over time. In such embodiments or aspects, the target objects may be plants such as containered plants and the present invention is directed to methods and systems for machine vision object recognition activities for containered plant inventory. The present invention accordingly may be directed to a method for performing machine vision object recognition activities for containered plants wherein the method includes the steps of (i) creating a digital image series that includes a seed digital image set including digital images and at least one subsequent digital image set including digital images, wherein the at least one subsequent digital image set is generated subsequent in time to the seed digital image set; (ii) creating an object detector series, said creating step (ii) comprising a) creating a seed object detector from the seed digital image set, the seed object detector comprising an architecture and a set of weights directed to recognition of target objects; and b) creating at least one deep learning object detector from the at least one subsequent digital image set and derived from said seed object detector, the deep learning object detector including an architecture and a set of weights trained for recognition of the evolution of the target objects over time; and optionally (iii) creating a report from the at least one deep learning object detector. Similarly, the present invention may be directed to a system for performing machine vision recognition activities for containered plants wherein the system includes i) a digital image series that includes a seed digital image set comprising digital images and at least one subsequent digital image set comprising digital images, wherein said at least one subsequent digital image set is generated subsequent in time to said seed digital image set; and (ii) an object detector series that includes a) a seed object detector created from the seed digital image set, the seed object detector including an architecture and a set of weights directed to recognition of target objects; and b) at least one deep learning object detector created from said at least one subsequent digital image set and trained from said seed object detector, the deep learning object detector including a deep learning architecture and a set of weights trained for recognition of the evolution of said target objects over time Further, environments and systems that generally involve presence, growth and development of living organisms, and in particular microscopic living organisms, are contemplated as within the scope of the present invention. Non-limiting examples may include machine vision object recognition activities for living organisms such as for example unicellular and multicellular organisms, including prokaryotic organisms such as bacteria and archaea; eukaryotic organisms; viruses, protozoa, algae, fungi and the like that may be performed using digital images generated by a digital imaging microscope. In such embodiments or aspects, the present invention is a method for performing machine vision recognition activities for living organisms that includes the steps of (i) creating a digital image series that includes a seed digital image set including digital images and at least one subsequent digital image set including digital images, wherein the at least one subsequent digital image set is generated subsequent in time to the seed digital image set; (ii) creating an object detector series, said creating step (ii) comprising a) creating a seed object detector from the seed digital image set, the seed object detector comprising an architecture and a set of weights directed to recognition of target objects; and b) creating at least one deep learning object detector from the at least one subsequent digital image set and derived from said seed object detector, the deep learning object detector including an architecture and a set of weights trained for recognition of the evolution of the target objects over time; and optionally (iii) creating a report from the at least one deep learning object detector. Similarly, in such embodiments or aspects, the present invention is a system for performing recognition activities for living organisms that includes i) a digital image series that includes a seed digital image set comprising digital images and at least one subsequent digital image set comprising digital images, wherein said at least one subsequent digital image set is generated subsequent in time to said seed digital image set; and (ii) an object detector series that includes a) a seed object detector created from the seed digital image set, the seed object detector including an architecture and a set of weights directed to recognition of target objects; and b) at least one deep learning object detector created from said at least one subsequent digital image set and trained from said seed object detector, the deep learning object detector including a deep learning architecture and a set of weights trained for recognition of the evolution of said target objects over time.

More broadly, the methods and systems of the present invention are contemplated to be broadly useful as methods and systems for performing machine vision object recognition activities (such as by way of non-limiting example counting, location, classification, identification and detection of changes condition, status, size and like), in particular for dynamic objects. The phrase "dynamic objects" is meant to include any object or target object or collection of objects or target objects which generally evolve or change over time. "Evolve or change" may include by way of non-limiting example changes in size, shape, form, location, number, status, presence or absence, condition and the like, particularly of target objects. While many dynamic objects or target objects may be living organisms such as plants, fruits and cellular organisms, objects that change or evolve over time and which may be termed "non-living", such as crystals, stars, planets, clouds and the like may be considered dynamic objects.

The present invention accordingly may be directed to a method for performing machine vision object recognition activities for dynamic objects wherein the method includes the steps of (i) creating a digital image series that includes a seed digital image set including digital images and at least one subsequent digital image set including digital images, wherein the at least one subsequent digital image set is generated subsequent in time to the seed digital image set; (ii) creating an object detector series, said creating step (ii) comprising a) creating a seed object detector from the seed digital image set, the seed object detector comprising an architecture and a set of weights directed to recognition of target objects; and b) creating at least one deep learning object detector from the at least one subsequent digital image set and derived from said seed object detector, the deep learning object detector including an architecture and a set of weights trained for recognition of the evolution of the target objects over time; and optionally (iii) creating a report from the at least one deep learning object detector. Similarly, the present invention may be directed to a system for performing machine vision recognition activities for dynamic objects wherein the system includes i) a digital image series that includes a seed digital image set comprising digital images and at least one subsequent digital image set comprising digital images, wherein said at least one subsequent digital image set is generated subsequent in time to said seed digital image set; and (ii) an object detector series that includes a) a seed object detector created from the seed digital image set, the seed object detector including an architecture and a set of weights directed to recognition of target objects; and b) at least one deep learning object detector created from said at least one subsequent digital image set and trained from said seed object detector, the deep learning object detector including a deep learning architecture and a set of weights trained for recognition of the evolution of said target objects over time.

For avoidance of doubt, it is expressly provided for that the information and descriptions herein regarding features or elements of one aspect of the present invention are asserted as applicable to and relied on to also support those features and elements when described with regard to all other aspects of the invention. Accordingly, the terms, phrases, definitions and descriptions employed to describe one or more methods of the present invention, their elements and advantages equally apply to and describe one or more systems of the present invention, their elements and advantages. Similarly, the terms, phrases, definitions and descriptions employed to describe one or more systems of the present invention, their elements and advantages equally apply to and describe one or more methods of the present invention, their elements and advantages.

I claim:

1. A method for performing machine vision scouting activities for an orchard during a growing season, said method comprising:
creating a digital image series including:
a seed digital image set including digital images of target objects; and
a plurality of subsequent digital image sets including digital images of the target objects generated subsequent in time to the seed digital image set; and
creating an object detector series by:
training a seed object detector to detect the target objects by:
providing images of the seed digital image set as input to the seed object detector;
obtaining outputs of the seed object detector based on the images of the seed digital image set; and
updating weights of the seed object detector based on comparing the outputs of the seed object detector to annotations corresponding to the images of the seed digital image set; and creating a sequence of deep learning object detectors usable for recognition of the evolution of the target objects over time during the growing season by:
creating a first deep learning object detector of the sequence by further training the seed object detector using a first subsequent digital image set that includes images of the target objects taken during a first period of the growing season; and
creating a second deep learning object detector of the sequence by further training the first deep learning object detector using a second subsequent digital image set that includes images of the target objects taken during a second period of the growing season.

2. The method of claim 1 wherein the sequence of deep learning object detectors includes at least three deep learning object detectors, each trained from a preceding deep learning object detector in the sequence using a corresponding subsequent digital image set that includes images of the target objects taken during a corresponding period of the growing season.

3. The method of claim 1 further comprising, between said creating a digital image series and said creating an object detector series, forming a segmentation mask which masks inapplicable portions of said digital images.

4. The method of claim 1 wherein the method achieves an F1 score of 0.75 or higher.

5. The method of claim 1 further comprising performing machine vision scouting activities for said orchard during a subsequent growing season that is subsequent to said growing season using at least one deep learning object detector of the sequence of deep learning object detectors from said growing season.

6. The method of claim 1 further comprising:
creating a report using at least one deep learning object detector of the sequence of deep learning object detectors; and
managing said orchard based on information contained in the report.

7. The method of claim 1 wherein creating a digital image series comprises creating digital images of 0.1% to 100% of the total plants of said orchard.

8. A system for performing machine vision scouting activities for an orchard during a growing season, said system comprising:
a digital image series that includes:
a seed digital image set that includes digital images of target objects; and
a plurality of subsequent digital image sets including digital images of the target objects generated subsequent in time to the seed digital image set; and
an object detector series that includes:
a seed object detector that was trained to detect the target objects by being configured to:
obtain images of the seed digital image set;
generate outputs based on the images of the seed digital image set; and
update weights of the seed object detector based on comparing the outputs to annotations that correspond to the images of the seed digital image set; and
a sequence of deep learning object detectors usable for recognition of the evolution of the target objects over time during the growing season, wherein the sequence of deep learning object detectors includes:
a first deep learning object detector created by further training the seed object detector using a first subsequent digital image set that includes images of the target object taken during a first period of the growing season; and
a second deep learning object detector created by further training the first deep learning object detector using a second subsequent digital image set that includes images of the target objects taken during a second period of the growing season.

9. The system of claim 8 further comprising a reporting system that, in operation, creates a report using at least one deep learning object detector of the sequence of deep learning object detectors.

10. The system of claim 8 further comprising a segmenter that, in operation, forms a segmentation mask masking inapplicable portions of said digital images.

11. The system of claim 8 further comprising a digital image generator.

12. The system of claim 11 wherein said digital image generator is a plurality of digital image generators.

13. The system of claim 12 wherein said plurality of digital image generators comprises a plurality of still-image digital cameras that are mounted on a motorized land-traversing vehicle.

14. The system of claim 13 wherein said vehicle is an on-board-human-driven vehicle.

15. The system of claim 12 wherein said plurality of digital image generators are mounted on an aerial vehicle.

16. The system of claim 8 wherein the sequence of deep learning object detectors includes at least three deep learning object detectors, each trained from a preceding deep learning object detector in the sequence using a corresponding subsequent digital image set that includes images of the target objects taken during a corresponding period of the growing season.

17. One or more non-transitory computer-readable media storing instructions executable by one or more processors to perform actions, the actions comprising:
creating a digital image series including:
a seed digital image set including digital images of a dynamic object; and
a plurality of subsequent digital image sets including digital images of the dynamic object generated subsequent in time to the seed digital image set; and
creating an object detector series by:
training a seed object detector to detect the dynamic object by:
providing images of the seed digital image set as input to the seed object detector;
obtaining outputs of the seed object detector based on the images of the seed digital image set;
updating weights of the seed object detector based on comparing the outputs of the seed object detector to annotations corresponding to the images of the seed digital image set; and
creating a sequence of deep learning object detectors usable for recognition of the evolution of the dynamic object over time during the growing season by:
creating a first deep learning object detector of the sequence by further training the seed object detector using a first subsequent digital image set that includes images of the dynamic object taken during a first period of the growing season; and
creating a second deep learning object detector of the sequence by further training the first deep learning object detector using a second subsequent digital image set that includes images of the target objects taken during a second period of the growing season.

18. A system for performing machine vision recognition activities for a dynamic object, the system comprising:
   one or more processors; and
   one or more memories storing:
   a digital image series that includes:
      a seed digital image set that includes digital images of the dynamic object; and
      a plurality of subsequent digital image sets including digital images of the dynamic object generated subsequent in time to the seed digital image set; and
   an object detector series that includes:
      a seed object detector that was trained to detect the dynamic object by being configured to:
         obtain images of the seed digital image set;
         generate outputs based on the images of the seed digital image set; and
         update weights of the seed object detector based on comparing the outputs to annotations that correspond to the images of the seed digital image set; and
      a sequence of deep learning object detectors usable for recognition of the evolution of the dynamic object over time, wherein the sequence of deep learning object detectors includes:
         a first deep learning object detector created by further training the seed object detector using a first subsequent digital image set that includes images of the dynamic object taken during a first period; and
         a second deep learning object detector created by further training the first deep learning object detector using a second subsequent digital image set that includes images of the dynamic object taken during a second period.

19. The system of claim 18 further comprising a reporting system that, in operation, creates a report using at least one deep learning object detector of the sequence of deep learning object detectors.

20. The system of claim 18 further comprising a segmenter that, in operation, forms a segmentation mask that masks inapplicable portions of said digital images.

* * * * *